United States Patent [19]
Aymeric et al.

[11] Patent Number: 6,111,526
[45] Date of Patent: Aug. 29, 2000

[54] VEHICLE COURSE STEERING AID DEVICE

[75] Inventors: Bruno Aymeric, Le Taillan; Roger Parus, Merignac, both of France

[73] Assignee: Sextant Avionique, Velizy Villacoublay, France

[21] Appl. No.: 09/147,613

[22] PCT Filed: Jul. 29, 1997

[86] PCT No.: PCT/FR97/01414

§ 371 Date: Feb. 2, 1999

§ 102(e) Date: Feb. 2, 1999

[87] PCT Pub. No.: WO98/05928

PCT Pub. Date: Feb. 12, 1998

[30] Foreign Application Priority Data

Aug. 2, 1996 [FR] France .................................. 96 09804

[51] Int. Cl.[7] .................................................. G01C 23/00
[52] U.S. Cl. ........................ 340/972; 340/973; 340/974; 244/181; 244/183; 701/14; 701/16; 73/178 R; 73/178 T
[58] Field of Search ..................................... 340/972, 973, 340/974, 980, 971; 244/181, 182, 183; 701/16, 14; 73/178 T, 178 R

[56] References Cited

U.S. PATENT DOCUMENTS

| | | | |
|---|---|---|---|
| 4,368,517 | 1/1983 | Lovering | 701/16 |
| 4,419,079 | 12/1983 | Georges et al. | 434/43 |
| 4,454,496 | 6/1984 | Lowe | 340/980 |
| 5,289,185 | 2/1994 | Ramier et al. | 340/971 |
| 5,593,114 | 1/1997 | Ruhl | 244/183 |
| 5,610,764 | 3/1997 | Faivre et al. | 359/630 |
| 5,675,327 | 10/1997 | Coirier et al. | 340/973 |
| 5,677,685 | 10/1997 | Coirier et al. | 340/479 |
| 5,684,496 | 11/1997 | Parus | 345/7 |
| 5,695,157 | 12/1997 | Coirier et al. | 244/183 |

*Primary Examiner*—Benjamin C. Lee
*Attorney, Agent, or Firm*—Oblon, Spivak, McClelland, Maier & Neustadt, P.C.

[57] ABSTRACT

A device for assisting the piloting of a vehicle by instruments. Various indications are displayed on an aircraft head-up view finder including a horizontal line graduated in terms of heading, a perpendicular line graduated in terms of atitude, an aircraft symbol representing the direction of the longitudinal axis of the aircraft above the horizontal line and a velocity vector symbol representing the tracking slope followed by the aircraft with respect to the ground. These are determined with respect to the tracking and atitude scales. The guidance window whose position is references with respect to the same axis is also displayed. The pilot must control the aircraft as to bring the velocity vector into the guidance window and keep it there. The window is placed on the screen at a position which is computed by the computer and which corresponds to the direction of a point of the desired path of the aircraft, this point being at a predetermined distance ahead of the aircraft.

20 Claims, 7 Drawing Sheets

VEHICLE COURSE STEERING AID DEVICE

BACKGROUND OF THE INVENTION

1. Field of the Invention

The present invention relates to a device for assisting the piloting or the simulation of the piloting of a vehicle. It applies mainly to aircraft, but it can be applied also to all sorts of other air, land or sea vehicles, especially when they are manoeuvred in a three-dimensional space. The invention will be described with regard to the piloting of an aircraft, and in particular the piloting in the landing phases.

2. Discussion of the Background

Under manual piloting, the pilot acts by sight to modify the direction of movement of his vehicle for the aid of the trim and engine controls.

Assistance with the manual piloting of an aircraft can be carried out by displaying, in front of the pilot's eyes, symbols representing the terrestrial environment and the movement of this aircraft, these symbols being superimposed, when the visibility is sufficient, with the real horizon and real environment seen by the pilot through the windscreen of his vehicle. The position and shape of the symbols are computed and displayed for example by the computer controlling a head-up collimator from data supplied by sensors carried on board the aircraft.

On the display screen of a known device for assisting aircraft piloting, the artificial horizon computed is symbolized by a line which tilts as a function of the lateral tilt (angle of roll) of the aircraft. It is superimposed on the visible real horizon if visibility is sufficient. It replaces it when visibility is insufficient. The projection at infinity of the longitudinal axis of the aircraft is portrayed by a symbol termed the "aircraft symbol". This symbol is above the horizon line to a greater or lesser extent depending on whether the aircraft is nose-up to a greater or lesser extent (greater or lesser longitudinal attitude of the aircraft); the attitude of the aircraft can be referenced by the position of the aircraft symbol in front of an attitude scale perpendicular to the horizon line. The lateral position of the aircraft symbol, representing the heading followed, is referenced moreover with respect to a graduated scale referenced with respect to north and scrolling along the horizon line. For the pilot, the position of the aircraft symbol on the screen portrays the longitudinal axis of the aircraft at any moment.

For landing, the terrestrial environment reconstructed on the display screen can be supplemented with a representation of the runway whose characteristics are catalogued in landing strip configuration documents which can be accessed by the computer. This artificial representation of a runway is superimposed on the visible real runway when the conditions of visibility are satisfactory. It replaces it when visibility is insufficient.

Moreover, the real direction of movement of the aircraft is different from that of its longitudinal axis, especially on account of sidewind and on account of the fact that the aerodynamic forces which keep the aircraft aloft and its transverse accelerations originate from the tilt of the wing with respect to the direction of movement. This is why the direction of real movement of the aircraft is represented on the screen by a particular symbol generally called the velocity vector. This movement symbol represents the direction of the real velocity vector of the aircraft with respect to the ground; it is defined by two orthogonal components which are on the one hand the drift of the aircraft in a horizontal plane and on the other hand the climb or descent slope of the aircraft with respect to the horizontal plane.

The drift is the angle between the track and the heading of the aircraft, where the direction of the track is defined by the horizontal component of the velocity of the aircraft with respect to the ground, whilst the heading is defined by the direction of the horizontal projection of the axis of the aircraft. Additionally, the climb or descent slope of the aircraft with respect to the ground is defined by an angle whose tangent is the ratio of the vertical component to the horizontal component of the real speed of the aircraft with respect to the ground.

The velocity vector symbol, that is to say the direction of real movement of the aircraft, can be represented on the display screen in a reference frame consisting on the one hand of the moving horizon line, graduated in angular units of heading, and on the other hand of an axis perpendicular to the artificial horizon line, graduated in angles of climb or descent. The velocity vector symbol is placed on the screen at a position referenced with respect to these two axis, as a function of drift (plotted as abscissa along the horizon line) and slope (plotted as ordinate on the axis perpendicular to the horizon line). Drift and slope are computed by the on-board instruments. The pilot can ascertain the drift and the slope at any moment by looking at the position of the symbol with respect to these two axes.

With such a piloting device, the pilot can carry out his manoeuvres by controlling the aircraft movement symbol directly on the display screen in front of his eyes, in particular when visibility is insufficient.

This piloting is further aided by the displaying on the screen, at each instant, of a guidance symbol computed by the computer as a function of a theoretical direction to be followed. Piloting then consists in acting on the controls of the aircraft in a sense which tends to take the movement symbol (or velocity vector) towards the guidance symbol on the screen. When the guidance symbol has the form of a window, piloting consists in trying to keep the movement symbol within the window representing the guidance symbol. Proper guidance therefore depends mainly on the position of the centre of the guidance symbol on the screen, and also on the shape and dimensions of this symbol.

An assistance device which makes it possible to display a guidance window in the case of assistance with landing on a runway equipped with an ILS system (Instrument Landing System) is already known through Patent EP 0 044 777.

In the ILS systems, allowing runway approach in poor visibility, an ideal line of descent is proposed to the vehicle and the deviations between this line and the actual position of the vehicle are measured.

Thus, when the aircraft is moving in such a way that the deviations are constantly zero, the real path of the vehicle coincides with the ideal line.

This ideal line of descent is a line belonging to the vertical plane passing through the axis of the runway and exhibiting an inclination $\theta_0$ with respect to the horizontal plane of the ground. The inclination $\theta_0$ is around 2.5 to 3 degrees.

FIG. 1 depicts a view of the vertical plane passing through the axis of the runway. The ideal line of descent 10 belongs to the vertical plane passing through the axis 11 of the runway, it is defined there by its inclination $\theta_0$ with respect to the horizontal plane of the ground on the one hand and by its intersection with the ground at the ideal point of impact G for landing on this runway, on the other hand. The point G is on the axis of the runway, close to the start of the runway.

In this vertical plane, a measurement of the position P of the aircraft is performed by receiving, on an antenna aboard the aircraft, signals transmitted by a transmitter at G, this measurement $E_G$, or "Glide deviation", is the difference between the inclination of the ideal line 10 and the inclination of the line 12 joining the projection $P_v$ in this vertical plane of the position P of the aircraft on the one hand and the ideal point of impact G on the other hand.

The horizontal plane parallel to the ground and passing through the position P of the aircraft is represented by the line 17 in FIG. 1, and its contour at infinity represents the 360 degree horizon viewed from the position P.

FIG. 2 depicts a view from above of the runway, the axis 11 of the runway being the line joining the point G situated towards the start of the runway and a point L placed slightly beyond the end of the runway. The projection $P_h$ of the position P of the aircraft in this horizontal plane of the ground on the one hand and the point L on the other hand define a line 20 which deviates by the angle $E_L$ from the axis of the runway. The angle $E_L$, or "LOC deviation", is measured by receiving, on an antenna aboard the aircraft, signals from a radio transmitter placed at the point L.

The pilot therefore sees the point G at the angle $(\theta_0+E_G)$ below the horizon line, and the point L at the angle $E_L$ with respect to the heading of the runway.

And if the ILS receiver placed aboard the aircraft indicates a vertical angular deviation $E_G$ or a horizontal angular deviation $E_L$ which is not zero, the aircraft is not on the ideal line of descent.

The known assistance device displays as guidance symbol, a window whose position is defined on the screen from the measurement of the Glide deviation $E_G$ and LOC deviation $E_L$ angles. More precisely, the centre of the window is, on the display screen, at a position which differs from the ideal point of impact G (in the reference frame consisting of the moving horizon line graduated in angular units of heading and of the axis of longitudinal tilts), by amounts which are proportional respectively to the deviations $E_L$ and $E_G$ with the aid of proportionality coefficients $k_L$ and $k_G$. The pilot must seek to bring the symbol for the real movement of the aircraft into this window and keep it there.

Generally, the datum settings, corresponding to the successive positions of the centre of the guidance window, allow the vehicle progressively to approach the ideal line and hence to align its own path with this line. This constitutes guidance to a line.

The coefficients $k_G$ and $k_L$ regulate the damping of the datum: for small values of these coefficients, guidance towards the ideal line is slow and for higher values, the aircraft is directed more rapidly towards this line.

However, it is observed that when the aircraft is at a position P $(P_h, P_v)$ close to the point G, the taking into account of such a datum takes the vehicle beyond the ideal line and by following the successive datum settings for such guidance, the vehicle begins to oscillate to either side of the ideal line whilst also reducing its distance with respect to the point G. With such guidance, sighting up to the ideal point of impact G is unstable.

In Patent EP 0 044 777, to obtain more stable sighting the gain $K_G$ can vary as a function of the distance to the point G. Moreover, the guidance law is changed in the vertical plane on approaching the ground.

SUMMARY OF THE INVENTION

A purpose of the invention is to propose a guidance which does not have this drawback and which has other advantages for the pilot.

To arrive thereat, the invention proposes to display at each instant a guidance window centred on a point in space which is situated on a predetermined path and which is a predetermined distance d away from the current position of the vehicle.

The invention proposes more precisely a device for assisting the piloting, or the simulation of the piloting, of a vehicle, this device comprising means for determining the current position of the vehicle, a generator of symbols for aiding piloting, means for displaying these symbols, which include a velocity vector symbol whose position on the display means represents the direction of movement of the vehicle with respect to the ground and a guidance symbol whose position on the display means represents a datum direction in which the vehicle ought to move so as to join up with a predetermined path and means for computing this datum direction from the current position and from information about the said predetermined path, characterized in that the datum direction computed by the said computing means is the direction of the straight line connecting the current position of the vehicle to a datum point situated on a guidance path corresponding to the said predetermined path and a predetermined datum distance d away from the said position of the vehicle.

The assistance system therefore computes a datum direction by searching along the guidance path for a point situated at a predetermined distance d ahead of the vehicle.

The predetermined path is either the exact path which the vehicle ought ideally to follow or a simplified representation of this path, and in particular a representation in the form of successive straight line segments. The guidance path either coincides with the predetermined path (general case) or is derived from the predetermined path so as to take account of particular circumstances. A typical example of a case in which the guidance path is not the predetermined path which the vehicle should follow is the final aircraft landing phase, after the descent phase, in which the predetermined path is the axis of the runway since the aircraft must complete the landing by taxiing along the runway, but in which the guidance path is not the runway itself but is preferably one parallel to the axis of the runway, situated below the runway.

The main advantages of the invention are the following.

Firstly, it is easier to keep the movement symbol stable in the guidance window when the vehicle is on the theoretical path which it should follow or when it is immediately proximate to this path.

On the other hand, it is now possible to make the aircraft follow a continuous path guided by a discontinuous guidance path composed of segments. For example, contrary to the prior art systems, an aircraft can follow a predetermined path which comprises an ideal line of descent, a flareout curve on approaching the point of impact, and a taxiing line on the runway, this by using as guidance path a simple succession of two straight-line segments which are the ideal line of descent and a line parallel to the runway. The flareout curve is then followed automatically by the aircraft by the very principle of the invention, that is to say by the principle of the pursuit of a fictitious point which is situated a distance d ahead of the aircraft and which follows two successive straight-line segments. In the prior art, the theoretical guidance had to be interrupted ahead of the landing flareout.

The invention also makes it possible to follow a taxiing path on runways segment by segment from landing up to the point of parking, with a segmented guidance path and flareouts handled automatically by the system.

Finally, an essential advantage of the invention lies in the perception which the pilot has of the significance of the guidance window which he sees on his screen. For sure, in the prior art, the position of the window represented a datum direction to be followed by the aircraft, but this direction did not correspond to any real point in space towards which there would be reason to direct the aircraft. The direction referenced by a fraction of the Glide deviation altitude-wise and by a fraction of the LOC deviation laterally does not in fact correspond to any physical point in space having a particular significance for the pilot. And additionally, the Glide and LOC deviations in the ILS system are not even measured with respect to one and the same reference point since the LOC deviation is referred to a point L at the end of the runway whereas the Glide deviation is referred to a point G at the start of the runway.

In the invention, the window, or more exactly its centre, indicates to the pilot the direction of a point in space which is a datum point actually situated on the guidance path. The pilot can therefore mentally visualize this path, by imagining that the window is situated on this path. In particular, during the descent towards the runway, the pilot sees the runway on his screen in realistic perspective and he is well aware that the ideal descent path is a straight line directed towards the start of the runway and along the axis of the runway. He can therefore easily imagine the vertical descent plane and the window shows him, in an entirely realistic manner, a point of this path situated the distance d ahead of the aircraft.

This feature of the invention is very important since any pilot navigating with the aid of instruments must have a very realistic intuitive awareness of what his instruments are indicating to him so that he can, if need be, immediately and intuitively compare the indications from the instruments and the reality which he perceives moreover directly.

Generally, the invention allows guidance of a vehicle on any predetermined path by knowing this path and the position of the vehicle.

BRIEF DESCRIPTION OF THE DRAWINGS

The invention will be better understood with the aid of the descriptions based on the following figures.

DETAILED DESCRIPTION OF THE PREFERRED EMBODIMENTS

The invention will be described in more detail with regard to the piloting of an aircraft. It is assumed that the aircraft has, conventionally:

means necessary for determining its own position at any instant, means for computing it track and its slope, that is to say the two components of its real movement, which enable it to display a real movement symbol (or velocity vector) on a display screen;

and that it also has data for a predetermined path or datum path which it should follow or which it should join up with.

To make the explanation easier, it will firstly be assumed that the guidance path which will serve in aiding piloting is exactly the predetermined path which the aircraft should follow or join up with. This predetermined path is defined in an exact form with flareout curves between straight-line segments, or preferably in a simplified form with straight-line segments only.

The computer on board the aircraft can therefore compute at any moment that point F of the guidance path which is situated a distance d ahead of the position P of the aircraft.

Figure 1:
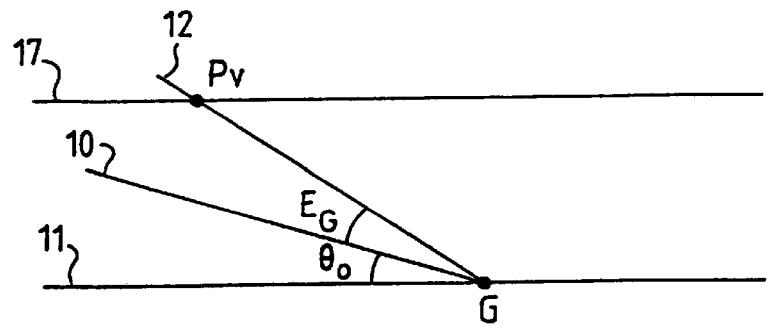
FIG. 1, already described, depicts a view of the vertical plane passing through the axis of a runway equipped with an ILS or equivalent system.
Figure 2:
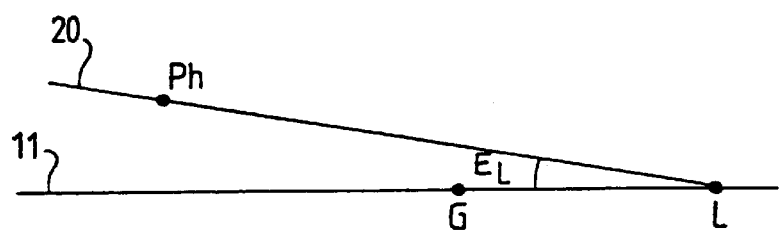
FIG. 2, likewise already described, depicts a view from above of the same runway.
Figure 3:
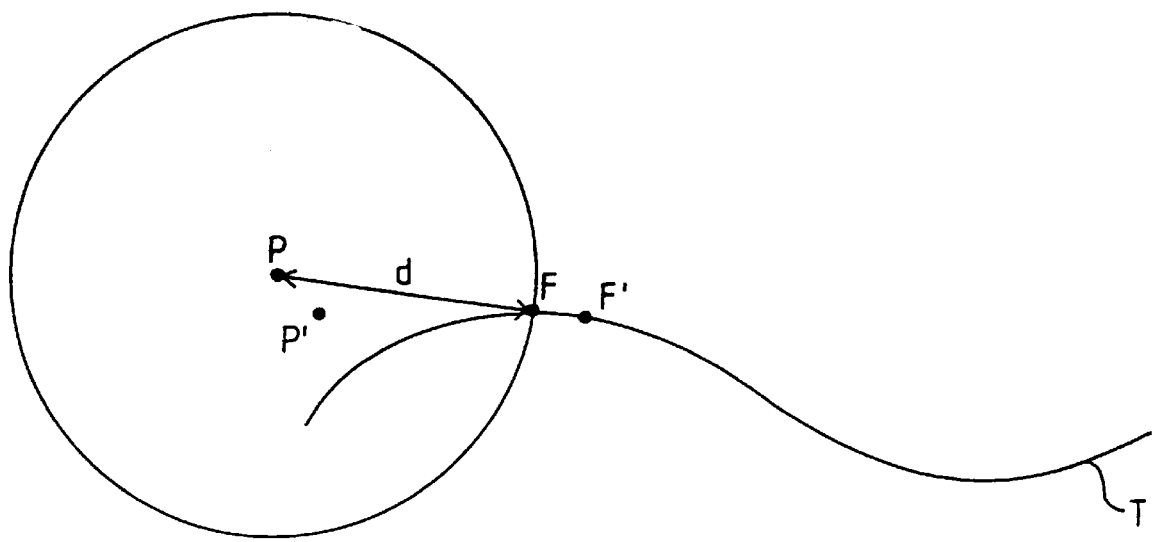
FIG. 3 depicts datum points on a guidance path.

A guidance symbol will be displayed on the screen at a position whose co-ordinates on the screen represent the two components (vertical and horizontal) of the direction connecting the point P to the point F. FIG. 3 illustrates this principle of distance d between the aircraft and a point of the datum path.

In FIG. 3, the guidance path T and the position P of the vehicle are known in the same reference frame, for example a reference frame fixed with respect to the earth. For the vehicle at the position P, the guidance datum according to the invention is the direction of the straight line connecting P to a datum point F such that F belongs to the guidance path T, such that the distance PF has the predetermined datum value d, and such that the point F is ahead of the aircraft.

Thus F is the point of interception of the guidance path T and of the sphere S with centre P and radius d. Naturally, only the point of intersection situated ahead of the path will be retained.

The pilot, by modifying his direction of movement so as to approach closer to the datum direction, will move his vehicle and when it gets for example to the position P' represented in FIG. 3, the new datum according to the invention, will be the straight line P'F', where F' is on the path T and the distance P'F' has the value d.

By considering, for example, the guidance path T formed of the segment of predetermined path $S_i$, the successive datum settings supplied by the invention allow the vehicle to join up with the predetermined path $S_i$.

Figure 4:
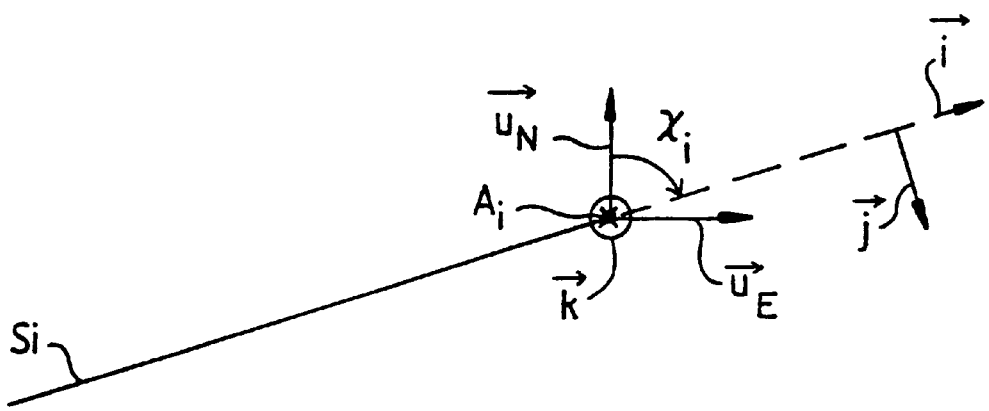
FIG. 4 depicts the aircraft and a segment of a specified path, seen from above.
Figure 5:
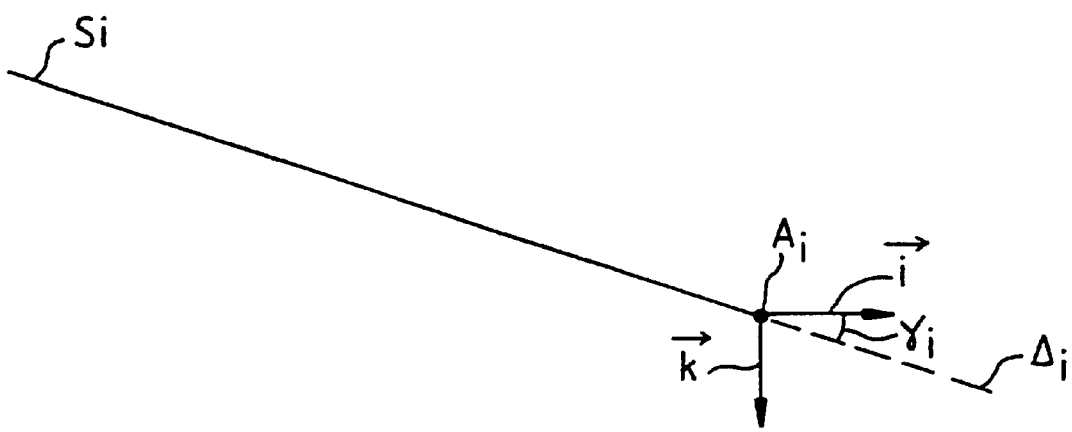
FIG. 5 depicts the vertical plane containing a segment of a predetermined path.

By way of example illustrated by FIGS. 4 and 5, the computation of the datum point F is developed for a position P of the aircraft with known latitude, longitude and altitude co-ordinates and for a predetermined path formed of an oriented segment $S_i$ defined with respect to the earth by the magnetic track $\chi_i$, its slope $\gamma_i$ and the co-ordinates of its culmination point $A_i$ in terms of latitude, longitude and altitude.

The magnetic track is the angle $\chi_i$, represented in FIG. 4, between magnetic north and the oriented segment $S_i$ and the slope is the angle $\gamma_i$ between the horizontal and the vertical in the vertical plane containing the segment $S_i$, and represented in FIG. 5.

By considering the earth to be locally flat, a simple terrestrial reference frame $R_N$ having the said point of culmination $A_i$ as origin is the one corresponding to the three orthogonal directions defined by magnetic North $\vec{u}_N$, East $\vec{u}_E$ and the vertical directed groundwards $\vec{k}$. The said reference frame $R_N(A_i, \vec{u}_N, \vec{u}_E, \vec{k})$ is represented in FIG. 4.

Of course, the use of magnetic North is not obligatory, and geographical North could equally well be used.

The device can consider the reference frame $R_i$ obtained by rotation, of the above reference frame $R_N$, by the angle $\chi_i$ about the axis $\vec{k}$. By considering the directions $\vec{i}$ and $\vec{j}$ in the horizontal plane such that $$\vec{i} = \cos\chi_i \vec{u}_N + \sin\chi_i \vec{u}_E$$

and $$\vec{j} = -\sin\chi_i \vec{u}_N + \cos\chi_i \vec{u}_E,$$

the reference frame $R_i$, with the point $A_i$ as origin and with directions $\vec{i}$ and $\vec{j}$ supplemented with the vertical direction $\vec{k}$, allows a straightforward computation of the co-ordinates of the datum point F for guidance.

Thus, the device, knowing the position P of the vehicle with respect to the earth, can compute the abscissa $x_p$, the ordinate $y_p$ and the height $z_p$ of this position P in the reference frame $R_i$, i.e. $P(x_p, y_p, z_p)$.

Moreover, the guidance path corresponding to the predetermined path formed by the segment $S_i$ is the straight line $\Delta_i$ supporting the segment $S_i$. And in this same reference frame $R_i$, the straight line $\Delta_i$ supporting the segment $S_i$ satisfies the simple equation $$\Delta_i \begin{cases} y = 0 \\ x\sin\gamma_i - z\cos\gamma_i = 0 \end{cases}$$

whereas the sphere SP with centre P and radius d satisfies the equation $$SP \ (x-x_p)^2 + (y-y_p)^2 + (z-z_p)^2 = d^2 \qquad (E1)$$

The point F which makes it possible to define the datum in the direction PF lies at the intersection of the sphere SP and of the guidance line $\Delta_i$, its co-ordinates F(x, y, z) in the reference frame $R_i$ satisfy the system of equations for the straight line $\Delta_i$ and also the equation of the sphere SP.

$$\text{i.e.} \begin{cases} y = 0 \\ x\sin\gamma_i - z\cos\gamma_i = 0 \\ (x-x_p)^2 + (y-y_p)^2 + (z-z_p)^2 = d^2 \end{cases} \qquad (E2)$$

which can be expressed in the following form:

$$\begin{cases} y = 0 \\ z = x\tan\gamma_i \\ x^2(1+\tan^2\gamma_i) - 2x(x_p + z_p k_g \gamma_i) + (x_p^2 + y_p^2 + z_p^2) - d^2 = 0 \end{cases} \qquad (E3)$$

The value of the abscissa x of the datum point F emerges from the solutions of equation E3.

If two solutions exist, the device takes for example the larger value.

Moreover, if the value retained is positive, the segment $S_i$ has been passed, and it is then necessary to search for the intersection with the next segment $S_{i+1}$, of predetermined path commencing at the culmination point $A_i$ of the segment $S_i$ and finishing at the culmination point $A_{i+1}$ of the next segment $S_{i+1}$.

Figure 6:
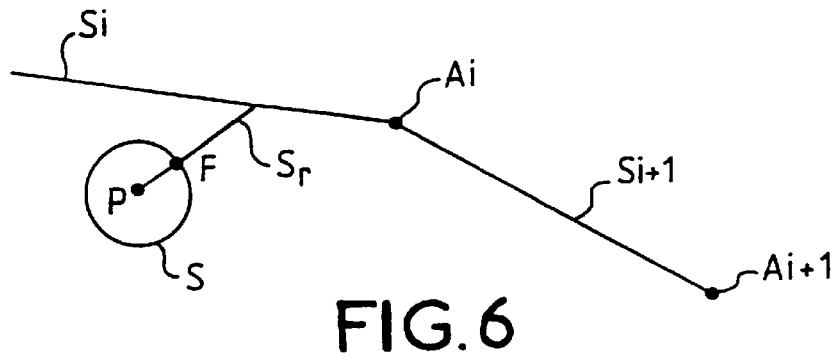
FIG. 6 depicts a segment for linking up with a predetermined path, the whole forming a guidance path.

If there is no solution, as in FIG. 6 where the consecutive segments $S_i$ and $S_{i+1}$ have no intersection with the sphere S with centre P and radius d, the vehicle will be able to follow an intermediate link-up segment $S_r$ so as to join up with the segment $S_i$. Such an intermediate segment is represented in FIG. 6, it can be proposed by default as guidance by the device but it can be defined by the pilot himself.

The vehicle at P is then directed towards the predetermined segment $S_i$ by following the guidance according to the link-up segment $S_r$, and then when the vehicle is sufficiently close to the segment $S_i$, the datum is based directly on the segment $S_i$.

Thus, the device determines the point F which is the solution to (E3) in the reference frame $R_i$ and, possessing the co-ordinates of P in the same reference frame, it can compute therein the co-ordinates of $\overrightarrow{PF}$ and finally express them in the reference frame $R_N$ by applying the transformation corresponding to the rotation $-\chi_i$ linking these two reference frames.

By knowing the position P of the vehicle and the segment of predetermined path $S_i$ it is possible for the device according to the invention to compute the position of the point F on which the datum direction is based and by knowing a segment $S_{i+1}$ which follows $S_i$ it is possible to extend the datum relating to the segment $S_i$ by that relating to the segment $S_{i+1}$, the datum point F sliding over the segment $S_i$ and then over the next segment $S_{i+1}$.

Figure 7:
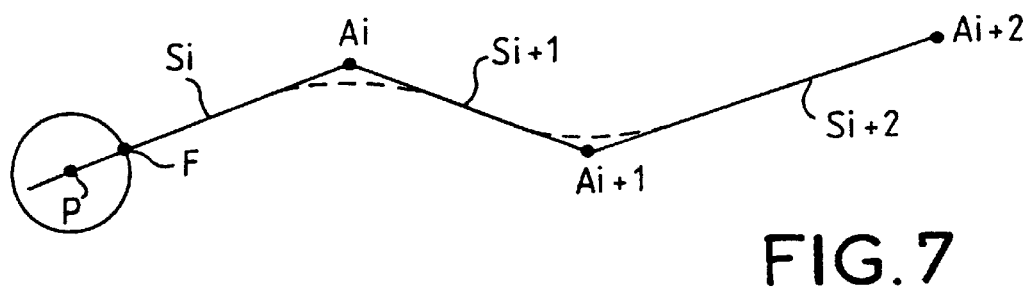
FIG. 7 depicts the real path of a vehicle following the datum according to the invention over a broken-line guidance path.

This guidance on a straight line, leads a vehicle which complies with the datum to meeting the datum line tangentially, and the stringing together of guidance segments leads the vehicle over a real path joining the segments by tangent flareouts represented dashed in FIG. 7.

The flareout is handled directly by this principle of guidance by a point situated at a distance d and in accordance with broken segments. This is what makes it possible to use, as predetermined path to be followed by the aircraft, a simplified representation of this path, in the form of successive segments, but it will be understood that the invention is also applicable if the predetermined path supplied to the computer is already an exact path with predetermined flareouts.

Adjusting the distance datum d makes it possible to handle flareouts of greater or lesser tightness. For example, it is possible to fix a predetermined distance d1 for the altitude-wise navigation paths, a distance d2 smaller than d1 to handle the approach to and following of the descent path, and finally an even smaller distance d3 to handle the landing proper, in particular to handle the final flareout before the point of impact with the ground.

Figure 8:
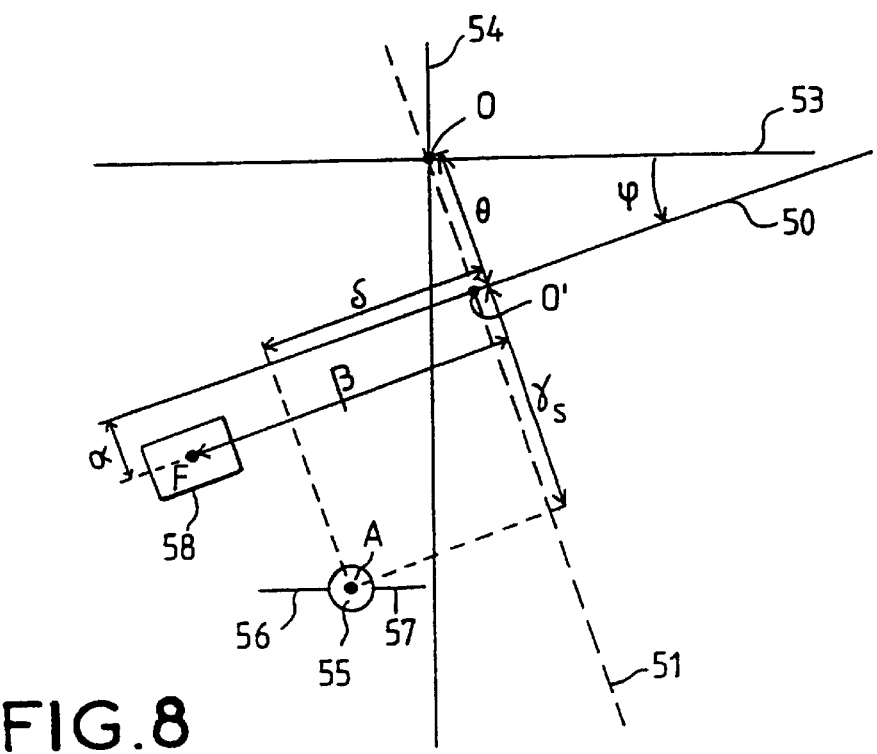
FIG. 8 depicts a display for assisting piloting.

The preferred embodiment of the device according to the invention comprises a display device, fixed rigidly to the vehicle and whose image projected in front of the pilot's eyes is represented in a simplified form in FIG. 8.

In this image, a horizontal reference plane of the vehicle passing through its centre of gravity is represented by a horizontal axis 53, a vertical reference plane of the vehicle passing through its centre of gravity is represented by a vertical axis 54, and these two axes 53 and 54 have an intersection at the point O. The reference planes are those which correspond to a zero angle of pitch and a zero angle of roll for the aircraft. An aircraft symbol can be represented at the point O.

The moving horizon line 50 is defined with respect to the fixed axes of the aircraft 53 and 54 by its position relative to the point O and by its lateral tilt φ from the horizontal axis 53; the tilt of the horizon line corresponds to the lateral tilt (roll) of the aircraft, that is to say that due to the roll, the pilot who is tied to the tilt of the aircraft sees the artificial horizon line 50 tilt (exactly like the real horizon on which it is superimposed). The distance OO' from the horizon line 50 to the point O is proportional to the longitudinal tilt θ of the aircraft (longitudinal attitude of the aircraft). The point O in fact represents the projection at infinity of the longitudinal axis of the aircraft above the horizon line. The lateral tilt φ and longitudinal tilt θ are preferably supplied by an inertial module mounted on the vehicle. The horizon line 50 can be represented on the image by a continuous trace, it is graduated in angular units of heading and the value of the heading of the vehicle being supplied preferably by the said inertial module, the graduation can be portrayed on the image by traces perpendicular to this line and one degree distant for example. The graduation is a 360° scrolling graduation.

The straight line passing through the point O and orthogonal to the moving horizon line 50 is the longitudinal tilt line 51; it cuts the moving horizon line 50 at the point O' representing the heading of the vehicle, it is graduated in angular units so that the distance OO' is a measure of the longitudinal attitude θ. A heading symbol is displayed at the point O', the projection of the point O onto the horizon line 50.

The velocity vector symbol displays the direction of real movement of the vehicle with respect to the ground and is centred on a point A. Its abscissa on the moving horizon line 50 represents the track of the vehicle, a distance away from the point O' equal to the value of the drift 6 which is the angle between the track and the heading of the vehicle; the track is defined by the horizontal component of the ground speed of the vehicle. The ordinate of the point A on the longitudinal tilt line 51 represents the slope $\gamma_S$ of the vehicle with respect to the ground, that is to say an angle of descent with respect to the ground; the tangent of the slope is equal to the ratio of the vertical component to the horizontal component of the ground speed of the vehicle.

The velocity vector symbol is for example a circle 55 with centre A supplemented with two dashes 56 and 57 situated on either side of the centre A of the symbol on a straight line passing through the centre of this symbol and parallel to the horizontal axis of the vehicle 53.

In the image, the guidance symbol is centred on the representation of the datum point F in real space. According to the description above, the co-ordinates of the vector $\overrightarrow{PF}$ are known in the terrestrial frame of reference $R_N$, they therefore allow the positioning, on the image in the vehicle at the position P, of the representation of the datum point F. The co-ordinates of the centre of the guidance symbol are referenced like those of the movement symbol, with respect to the axes 50 (horizon line) and 51 (perpendicular to the horizon line through the point O). Thus, just as the screen position of the real movement symbol represents a direction of real movement of the aircraft expressed in terms of track and slope, the position of the guidance symbol in the same reference frame represents a datum direction to be followed by the aircraft in terms of track and slope with respect to the axis of the aircraft. And this direction is, according to the invention, that of the vector $\overrightarrow{PF}$, in which P is the position of the aircraft and F is a distance d from the aircraft on the guidance path. The co-ordinates of this vector $\overrightarrow{PF}$ are plotted on the screen as components of track (along the axis 50) and of slope (along the axis 51).

The purpose of assisted piloting is then to manoeuvre the aircraft in a sense which tends to make the movement symbol join up with the guidance symbol and remains centred on the latter. Specifically, if the guidance symbol is to the left of the movement symbol (the case of FIG. 8) according to the axis 50, the pilot must make the aircraft turn to the left. If the guidance symbol is above the movement symbol according to the axis 51, the pilot must reduce the descent slope.

The guidance symbol is for example a rectangular window 58 centred on the point F and whose dimensions reflect the acceptable deviations with respect to the exact datum F. These deviations are not necessarily the same in drift and in slope. And they are not necessarily the same during all the phases of flight, landing and taxiing.

The application of the invention will now be described in the case in which the ideal path data are supplied by an ILS system to define on the one hand the ideal line of descent towards a theoretical point of impact G, and on the other hand the axis of the runway on which the aircraft will taxi after impact. The predetermined path to be followed is represented by an ideal line of descent segment followed by a horizontal line segment on the axis of the runway. The flareout will be handled automatically.

Figure 9:
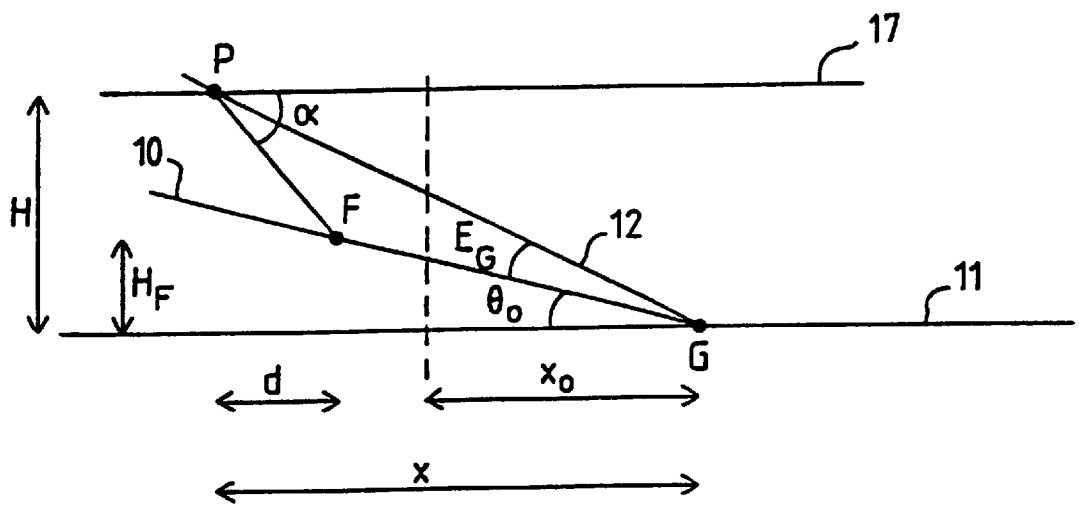
FIG. 9 depicts a landing guidance datum of the ILS type (vertical plane).

In the vertical plane represented in FIG. 9, passing through the axis of the runway 11, the ideal line of descent 10, corresponding to the guidance axis of the ILS beam, exhibits a tilt $\theta_0$ with respect to the axis 11 of the runway, and an intersection with the axis 11 of the runway at the point G.

An aircraft position cue is supplied by measuring, on the ILS receiver aboard the aircraft, the angle EG between the two planes passing through the horizontal axis comprising the point G and orthogonal to the axis of the runway 11 and such that one of the two planes contains the ideal line of descent 10 and the other plane contains the point P representing the position of the aircraft.

The altitude H of the aircraft is supplied for example by a radio altimeter mounted on the aircraft. When the aircraft is close to the ideal line of descent 10, itself of small tilt $\theta_0$ with respect to the horizontal plane, the horizontal distance x between the aircraft and the point P and the point G is simply equal to the ratio of the altitude H of the aircraft to the tilt $\theta_0$ of the ideal line of descent plus the measure $E_G$.

$$x = \frac{H}{\theta_O + E_G} \tag{E4}$$

In the preferred embodiment of the device according to the invention, a location cue for the a position P of the vehicle is supplied by an ILS system, but a satellite locating system such as GPS could also supply such a cue.

Once the aircraft is relatively near the guidance axis portrayed by the ILS beam, the geometrical characteristics of the position of the aircraft P, of the datum point F according to the invention, and of the ILS system allow a simplified expression for the position of the guidance symbol on the display means of the piloting assistance device.

According to the invention, the datum point F belongs to the ideal line of descent 10 and is the predetermined datum distance d away from the position P of the aircraft.

Under the above assumption of the proximity of the aircraft to the guidance axis, the altitude $H_F$ of the datum point F is represented by the product of the tilt $\theta_0$ of the ideal line of descent 10 times the difference between the said horizontal distance x and the predetermined datum distance d.

$$H_F = \theta_0(x-d) \tag{E5}$$

In the vertical plane of FIG. 9, the datum point F is seen by the aircraft at an inclination α whose value is supplied to the piloting aid symbol generator so as to define, for the image of FIG. 8 projected in front of the pilot's eyes, the ordinate of the centre of the guidance symbol along the longitudinal tilt line 51 referenced at the point O'.

The tilt α is the ratio of the difference in altitude between the position of the aircraft P and the datum point F over the datum distance d.

$$\alpha = \frac{H - H_F}{d} \tag{E6}$$

According to the invention, the ordinate α of the centre of the guidance symbol is a function of the following parameters supplied to the piloting assistance device:

the inclination $\theta_0$ of the ideal line of descent arising from the information about the landing strips, the altitude H of the aircraft as measured by the on-board radio altimeter, the measurement $E_G$ of the on-board ILS receiver the predetermined datum distance d $$\alpha = \theta_o + \frac{H}{d} - \frac{\theta_o}{d}\left(\frac{H}{\theta_o + E_G}\right) \tag{E7}$$

The predetermined datum distance d can be supplied by the pilot, for example, by digital input or by selecting a value from a list with the aid of a suitable device.

It can also be determined automatically by the assistance device according to the invention from for example information about the landing strip and about the design of the aircraft.

Measurement of the angle $E_G$ is no longer possible by the receiver aboard the aircraft when the latter is very close to the runway, that is to say a horizontal distance from the point G which is less than the minimum distance $x_0$ required for the validity of the measurement of the angle $E_G$.

After the aircraft has gone past the minimum distance $x_0$, the said horizontal distance x is no longer estimated by relation E4 but with the aid of an estimate of the distance travelled by the aircraft as a function of its ground speed V supplied by the inertial module mounted on board and of the time elapsed since it passed the position corresponding to the minimum distance $x_0$.

$$x = x_0 - \int V dt \tag{E8}$$

Thus, in the absence of a measurement of the angle $E_G$, the ordinate of the centre of the guidance symbol is deter-mined by the symbol generator through the following relation $$\alpha = \theta_o + \frac{H}{d} - \frac{\theta_o}{d}\left(x_o - \int V dt\right) \tag{E9}$$

Figure 10:
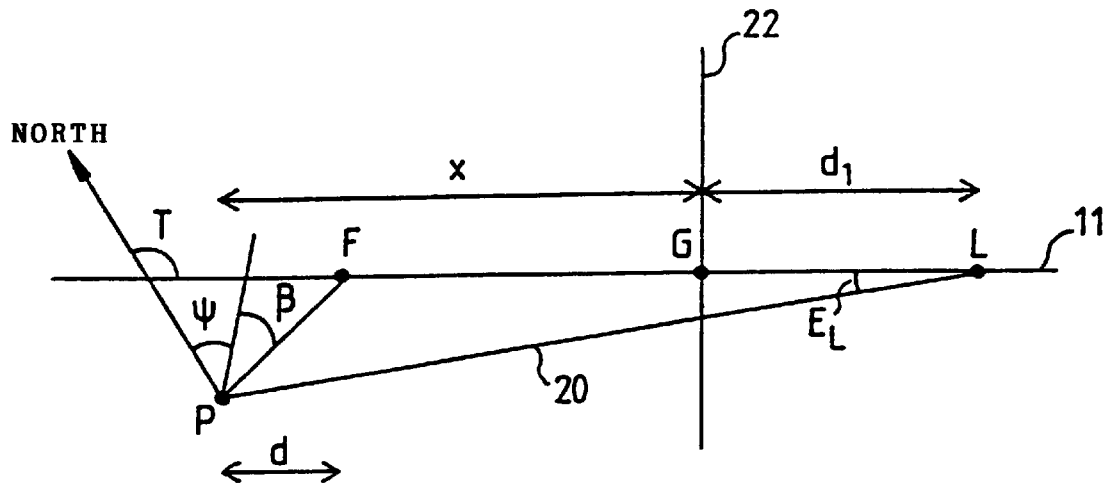
FIG. 10 depicts the same guidance datum (horizontal plane).

FIG. 10 represents a view from above of the runway; the axis of the runway 11 passes through the points G and L.

An aircraft position cue is supplied by measuring, on the ILS receiver aboard the aircraft, the angle $E_L$ between the axis of the runway 11 and the straight line 20 at the intersection of the horizontal plane of the runway and of the vertical plane passing through the point L of the runway and the position point P of the aircraft.

The runway axis oriented from the entrance towards the exit of the runway, hence from the point G towards the point L, exhibits a heading of value T supplied by the information about the landing strips together with the value d1 of the distance between the points G and L.

The heading of the aircraft ψ is supplied by the inertial module mounted on board.

The angle β is defined as the angle between the longitudinal axis of the aircraft represented by its heading ψ and the straight line at the intersection of the horizontal plane of the runway and of the vertical plane passing through the point G of the runway and the position point P of the aircraft.

According to the invention, the value of the angle β is supplied to the piloting aid symbol generator so as to define, for the image of FIG. 8 projected in front of the pilot's eyes, the abscissa of the centre of the guidance symbol along the moving horizon line 50 referenced at the point O'.

When the aircraft is close to the ILS guidance axis, the angle β is expressed with the aid of the horizontal distance x and of the following parameters:

the heading of the runway T and the length of the runway d1 arising from the information about the landing strips, the heading of the aircraft ψ supplied by the inertial module mounted on the aircraft, the measurement $E_L$ of the on-board ILS receiver, the predetermined datum distance d according to the following relation:

$$\beta = T - \psi - (x + d1)\frac{E_L}{d} \tag{E10}$$

where the computation of the value of the horizontal distance x was described above and summarized by relations E4 and E8.

In the presence of turbulence, the centre of the guidance symbol according to the invention has the advantage of remaining stable with respect to the terrestrial environment seen by the pilot. This makes it easier for the pilot to comply with the guidance datum.

In the image projected in front of the pilot's eyes, the guidance symbol is placed on the representation of the point F, it preferably has the form, represented in FIG. 8, of a rectangular window 58 with two sides parallel to the moving horizon line 50 and two sides parallel to the longitudinal tilt line 51.

To follow the guidance datum according to the invention, the pilot places the symbol for the velocity vector of his vehicle inside the outline of the guidance window 58 and keeps it there, the dimensions of this window reflecting the acceptable deviations between the direction of the vehicle and the exact datum direction represented by the point F.

In the vertical plane, the aircraft is regarded as deviating excessively with respect to the ideal line of descent when it leaves the beam determined by two descent planes.

This ideal descent plane is the plane passing through the ideal line of descent with inclination $\theta_0$ and through the horizontal axis, represented by the line 22 in FIG. 10, comprising the point G and orthogonal to the axis of the runway.

Figure 11:
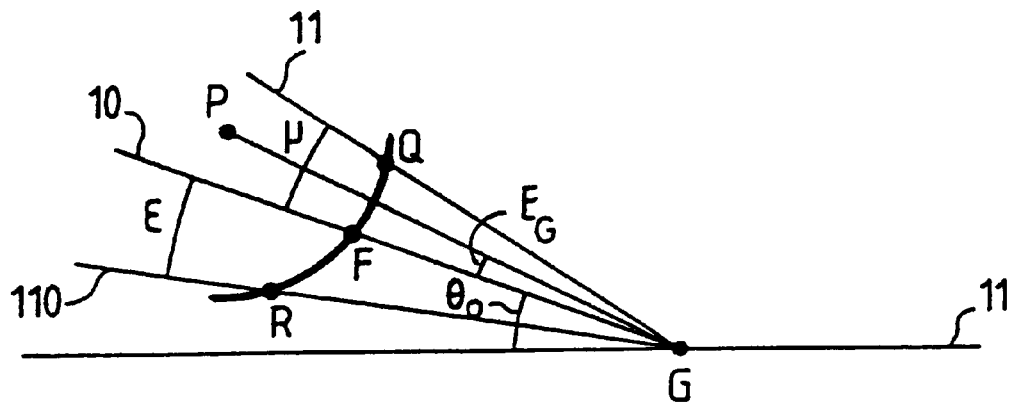
FIG. 11 depicts deviations in the vertical plane with respect to the ideal line of descent.

A beam, represented in FIG. 11, about the ideal descent plane is defined by its lower plane 110 and its upper plane 111 which are obtained by rotating the ideal plane about the horizontal axis 22 by the angles $\epsilon$ and $\mu$ respectively.

These angular values $\epsilon$ and $\mu$ can be proportional to that of the inclination $\theta_0$ of descent with proportionality coefficients $k_\epsilon$ and $k_\mu$, for example equal to 0.12.

Figure 12:
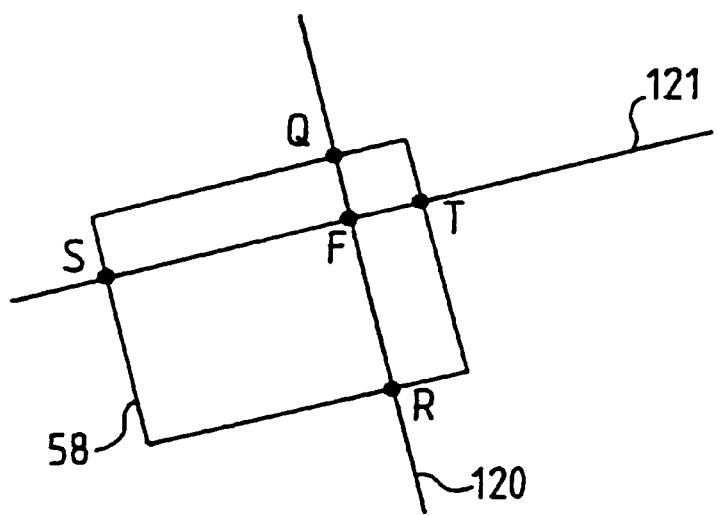
FIG. 12 depicts a guidance window calculated according to the invention.

The datum window 58 is more precisely represented in FIG. 12. The straight line 120 passing through its point F of centring on the datum and parallel to the longitudinal tilt line 51 has two intersections at the points Q and R with the sides of the window.

The line 121 passing through its point F of centring on the datum and parallel to the moving horizon line 50 has two intersections at the points S and T with the sides of the window.

In the image projected in front of the pilot's eyes, the abscissae of the points Q and R are equal to that of the centre of the guidance symbol on the ideal line of descent with inclination $\theta_0$.

The ordinate $\alpha_R$ of the point Q can be equal to that of the centre of a guidance symbol according to the invention corresponding to a descent on the upper plane 111 defined by the angles $\theta_0$ and $\mu$.

And the ordinate $\alpha_R$ of the point R can be equal to that of the centre of a guidance symbol corresponding to a descent on the lower plane 100 defined by the angles $\theta_0$ and $\epsilon$.

In this case, $\alpha_Q$ and $\alpha_R$ are estimated through the following relations $$\alpha_Q = \alpha + \mu - \frac{\mu}{d}\left(\frac{H}{\theta_o + E_G}\right) \tag{E11}$$

$$\alpha_R = \alpha - \varepsilon + \frac{\varepsilon}{d}\left(\frac{H}{\theta_o + E_G}\right) \tag{E12}$$

However, the values chosen for the representation of the window also comply with the constraints of presentation, the window having to be visible without being too large in the image to allow the pilot to follow the guidance.

In the horizontal plane, the aircraft must set its wheels down on the runway, thus the limit of the guidance at the border of the window at the point S can correspond to landing on an edge of the runway, and that of the point T correspond to the other edge. Such a width can be used throughout the guidance. However, a progressive alteration in the width can also be used.

Moreover, the presentation of the window can vary depending on the phases of the landing, in particular a modification of presentation may be advantageous in order to remind the pilot of a change of phase such as for example the start of a landing flareout where the pilot will have to modify his altitude and slow down.

An enhancement of the invention to improve landing proper will now be described, and it will be seen how in this case it may be desirable for the computer to calculate a guidance path which differs from the real predetermined path which the aircraft must join up with and differs from the simplified representation of this real path by segments.

Figure 13:
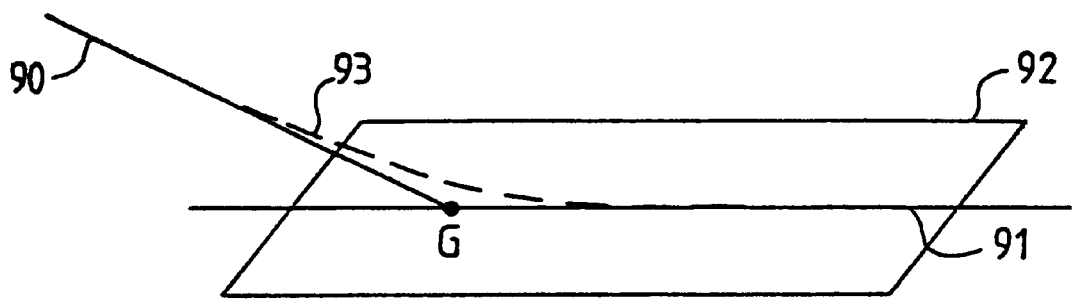
FIG. 13 represents in perspective a landing guidance datum with two segments, one of which is the axis of the runway.

Landing can be envisaged as the following of the particular datum path, represented in FIG. 13, comprising a descent segment 90 and a taxiing segment 91 on the axis of the runway 92.

The guidance according to the invention on such a path leads to a soft landing tangential to the runway and represented by the dashed curve 93, the accuracy of which would be insufficient for a landing without the complementary aid of flight by sight. The accuracy of the real point of impact is in fact sufficient only if the real path of the aircraft intersects the runway at a non-zero angle. In practice, in poor visibility a path angle of around one degree is considered to be desirable at the moment of impact.

This is why it is proposed, in an enhancement of the invention, that the guidance path be composed of a descent segment followed by a segment parallel to the axis of the runway and situated under the runway. This enhancement improves the accuracy of landing.

Figure 14:
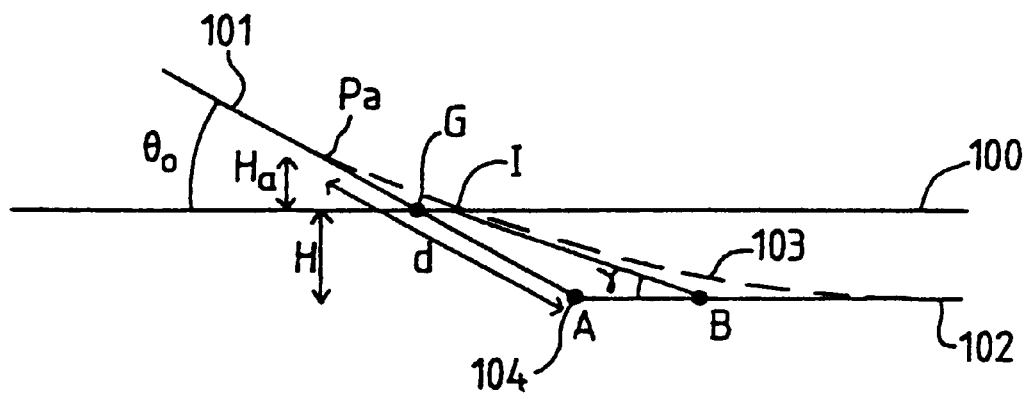
FIG. 14 represents a guidance datum with two segments, the second being situated under the axis of the runway.

FIG. 14 represents a view of the vertical plane in line with the axis 100 of the runway. The guidance according to this enhancement of the invention on the consecutive segments, descent segment 101 and segment under the runway 102, with automatic handling of flareout, leads to a real path, represented in this figure by the dashed curve 103, whose real point of impact I with the ground is more accurate than that obtained with a guidance segment coinciding with the axis of the runway.

When the vehicle is already on the line of descent 101, the automatic start-of-flareout due to such guidance is effected at the distant d from the point 104 of change of guidance segment and examination of the geometry represented in FIG. 14 makes it possible to establish the two parameters of depth $\Delta H$ of the guidance segment 102 under the runway and of predetermined datum distance d of such guidance.

This start-of-flareout is effected at the position $P_a$ of the guided vehicle, whose altitude is equal to the value Ha and whose guidance datum corresponding to this position $P_a$ is the point A such that the distance between A and $P_a$ is equal to d.

The point $P_a$ and the point A being on the line of descent 101 with slope $\theta_0$, their altitude deviation is related to their distance through the following relation E24

$$Ha + \Delta H = \theta_0 d \tag{E24}$$

After the start-of-flareout, the guidance datum follows the horizontal segment 102 under the runway axis and when the vehicle is at the real point of impact I, its guidance datum is the point B of this segment 102 such that the distance IB is equal to d, and the touch-down angle, defined as the angle $\gamma$ between the real path and the ground, is the angle between the segment IB and the segment 102 under the axis of the runway.

Thus, the depth $\Delta H$ of this segment and the datum distance d are related to the touch-down angle $\gamma$ by the following relation E25:

$$\Delta H = \gamma d \tag{E25}$$

If the touch-down angle $\gamma$ is different from the descent slope $\theta_0$, the pair of relations E24 and E25 is equivalent to the following pair of relations E26 and E27:

$$d = \frac{Ha}{\theta_o - \gamma} \tag{E26}$$

$$\Delta H = \gamma H \frac{a}{\theta_o - \gamma} \quad (E27)$$

which determines the parameters of the guidance according to the invention as a function of the imposed conditions of landing, namely the descent slope $\theta_0$ of around 3 degrees, the touch-down angle $\gamma$ of around 1 degree and the start-of-flareout height Ha imposed by the design of the vehicle and supplied by its constructor.

By way of example, for a value of descent slope $\theta_0$ of three degrees and a value of touch-down angle $\gamma$ of one degree, the value of the depth $\Delta H$ of the guidance segment under the runway is according to the invention equal to half the start-of-flareout value.

Thus, for a realistic value of start-of-flareout height for an average aircraft equal to 40 feet, horizontal guidance is sunk 20 feet under the runway axis and the datum distance is around 360 meters.

This datum distance d is that which applies during the terminal phase of landing; the distance during the descent phase may be different, and the distance during the previous phases of flight at altitude may again be different.

The alterations in the distance law will be able to be sufficiently regular as not to impair the continuity of piloting through jumps in the guidance datum distance (which would be manifested as a jump in the guidance window on the screen).

The above-described guidance according to the invention makes it possible to guide not only the approach manoeuvre but also the start-of-flareout and the flareout itself until impact with the ground on the runway and it can be extended to the phase of taxiing on the runway with the aid of an appropriate guidance datum, corresponding to the horizontal movement alone. In the taxiing phase after the point of impact G, the guidance path can continue to lie beneath the runway or return to the axis of the runway since the aircraft is no longer making a manoeuvre in three dimensions.

During taxiing, the datum direction is horizontal, along the segment PF, where the point F is on the axis of the runway at a predetermined distance d adapted to the constraints of the manoeuvres of the vehicle in this taxiing phase.

Given that the datum directions represented by the guidance symbol must have a sense with respect to the pilot's eye (for compliance with reality), whereas the pilot's eye is not in the plane of the wheels of the aircraft, it will be possible to slightly correct the position of the symbol displayed, in the final phases of landing and in the taxiing phases, so as to give the pilot the most realistic possible impression (the real movement symbol of the aircraft is referred to the longitudinal axis of the aircraft which is not situated at the height of the landing gear). The correction made, for example at the moment of impact, will be able to be an all-in correction taking account of the geometry of the aircraft and of its attitude at the moment of landing.

Everything just stated with regard to assistance with piloting is obviously applicable in a simulator since it is sought in a simulator to reproduce exactly the real conditions seen by the pilot. The only difference is that the vehicle position data are supplied by computation by the simulator which does not move instead of being supplied by instruments on board a vehicle which does move.

Figure 15:
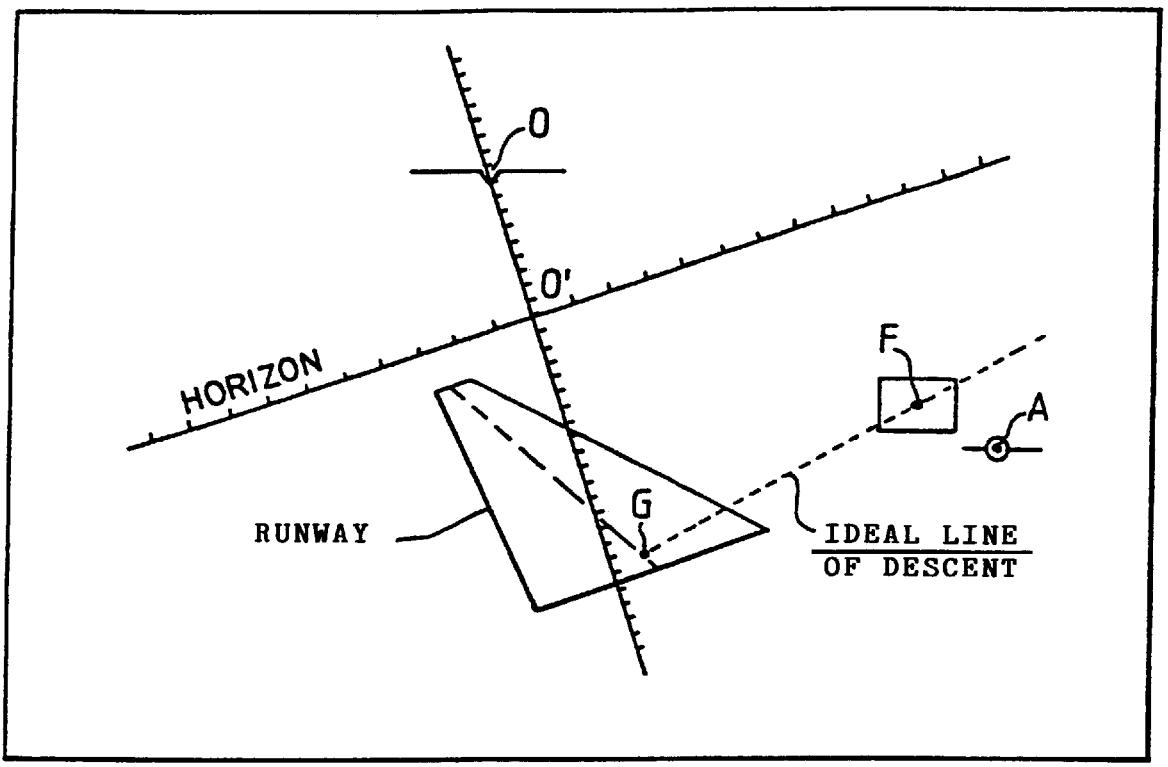
FIG. 15 represents the general appearance of the display screen on the approach to landing.

To complete this description, FIG. 15 illustrates a representation supplied to the pilot in the approach to a runway. The runway is represented in perspective below the horizon line, the device according to the invention displays a guidance window centred at the point F which here is a point of the ideal descent path, so that the pilot can easily make a concrete mental connection between this window and the ideal line which he must join up with, that is to say on the screen the straight line which connects the centre of the window and the start G of the runway.

Figure 16:
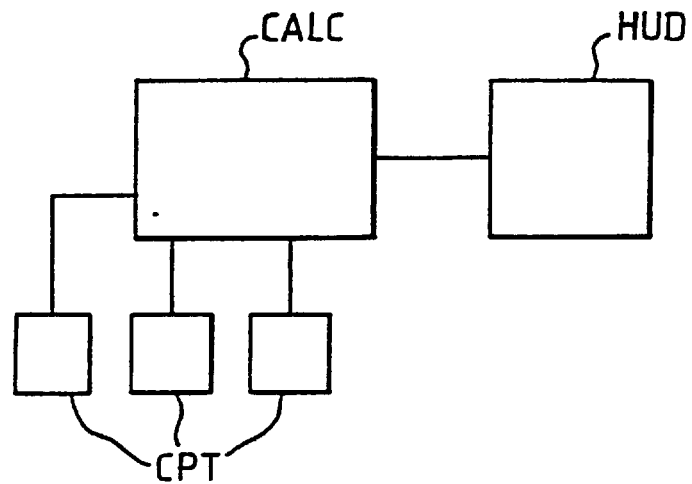
FIG. 16 represents the general structure of the navigation assistance device using a head-up collimator computer.

Naturally, the invention will be implemented with the aid of a computer. This computer is preferably, as shown by FIG. 16, the computer CALC which controls a head-up collimator HUD and which receives to this end measurements originating from various sensors CPT carried on board the aircraft, and especially sensors which supply measurements of position, trim and speed.

What is claimed is:

1. Device for assisting the piloting, or the simulation of the piloting, of a vehicle, this device comprising means for determining the current position of the vehicle, a generator of symbols for aiding piloting, means for displaying these symbols, which include a velocity vector symbol whose position on the display means represents the direction of movement of the vehicle with respect to the ground and a guidance symbol whose position on the display means represents a datum direction in which the vehicle ought to move so as to join up with a predetermined path and means for computing this datum direction from the current position and from information about the said predetermined path, characterized in that the datum direction computed by the said computing means is the direction of the straight line connecting the current position of the vehicle to a datum point situated on a guidance path corresponding to the said predetermined path and a predetermined datum distance d away from the said position of the vehicle.

2. Device according to claim 1, characterized in that the guidance path comprises at least one theoretical path segment which the vehicle should follow or join up with.

3. Device according to claim 2, characterized in that the predetermined path of the vehicle is a diagrammatic representation of a real path which the vehicle ought to follow.

4. Device according to claim 2, characterized in that the predetermined distance d is modifiable from one flight phase to another.

5. Device according to claim 1, characterized in that the guidance path comprises at least one path segment deduced by computing a theoretical path segment which the vehicle should follow or join up with.

6. Device according to claim 5, characterized in that the path segment deduced by computation is a segment parallel to the theoretical path segment.

7. Device according to claim 6, applied to the case of the landing of an aircraft, characterized in that the theoretical path segment is the axis of a runway and the corresponding guidance path segment is a segment parallel to this axis and situated under the runway at a depth allowing impact of the aircraft on the runway at a non-zero predetermined angle.

8. Device according to claim 7, characterized in that the predetermined path of the vehicle is a diagrammatic representation of a real path which the vehicle ought to follow.

9. Device according to claim 6, characterized in that the predetermined path of the vehicle is a diagrammatic representation of a real path which the vehicle ought to follow.

10. Device according to claim 5, characterized in that the predetermined path of the vehicle is a diagrammatic representation of a real path which the vehicle ought to follow.

11. Device according to claim 5, characterized in that the predetermined distance d is modifiable from one flight phase to another.

12. Device according to claim 6, characterized in that the predetermined distance d is modifiable from one flight phase to another.

13. Device according to claim 1, characterized in that the predetermined path of the vehicle is a diagrammatic representation of a real path which the vehicle ought to follow.

14. Device according to claim 13, characterized in that the predetermined path is a string of broken straight-line segments.

15. Device according to one of claim 1, characterized in that the predetermined distance d is modifiable from one flight phase to another.

16. Device according to claim 15, characterized in that the predetermined distance d is modified continuously between two values corresponding to two different flight phases so as to avoid abrupt jumps in the position of the guidance symbol on the display screen during changes in the value of this distance.

17. Device according to claim 1, applied to the landing of an aircraft, characterized in that the guidance path comprises at least one ideal descent straight-line segment situated along the axis of a runway, and a straight-line segment parallel to the axis of the runway, situated under the runway in a vertical plane containing this axis.

18. Device according to one of claim 1, characterized in that the guidance symbol is displayed on the screen at a position whose co-ordinates are defined in one and the same track and slope reference frame as the velocity vector symbol so that the vehicle is situated on a desired path segment when the velocity vector symbol is centred on the centre of the guidance symbol.

19. Device according to claim 1, characterized in that the guidance symbol consists of a rectangular window.

20. Device according to claim 19, characterized in that the rectangular window has dimensions corresponding to a maximum tolerated deviation in position with respect to an ideal theoretical path segment which the vehicle must follow, so that if the centre of the velocity vector symbol remains situated in the window, then the vehicle is definitely inside the limit of permitted deviation.

* * * * *